United States Patent
Park et al.

(10) Patent No.: US 11,609,763 B2
(45) Date of Patent: *Mar. 21, 2023

(54) PERFORMANCE SCALING FOR BINARY TRANSLATION

(71) Applicant: Microsoft Technology Licensing, LLC, Redmond, WA (US)

(72) Inventors: Hee Jun Park, Redmond, WA (US); Mehmet Iyigun, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,167

(22) Filed: Oct. 25, 2021

(65) Prior Publication Data
US 2022/0043656 A1    Feb. 10, 2022

Related U.S. Application Data

(63) Continuation of application No. 16/714,626, filed on Dec. 13, 2019, now Pat. No. 11,157,279, which is a continuation of application No. 16/273,080, filed on Feb. 11, 2019, now Pat. No. 10,732,975, which is a continuation of application No. 15/613,110, filed on Jun. 2, 2017, now Pat. No. 10,235,178.

(51) Int. Cl.
*G06F 9/30* (2018.01)
*G06F 9/48* (2006.01)
*G06F 9/50* (2006.01)
*G06F 8/52* (2018.01)
*G06F 9/38* (2018.01)

(52) U.S. Cl.
CPC ............ *G06F 9/30174* (2013.01); *G06F 8/52* (2013.01); *G06F 9/3009* (2013.01); *G06F 9/30043* (2013.01); *G06F 9/30083* (2013.01); *G06F 9/3836* (2013.01); *G06F 9/4893* (2013.01); *G06F 9/5094* (2013.01)

(58) Field of Classification Search
CPC .... G06F 9/30174; G06F 8/52; G06F 9/30043; G06F 9/30083; G06F 9/3009; G06F 9/3836; G06F 9/4893; G06F 9/5094; Y02D 10/00
See application file for complete search history.

*Primary Examiner* — Corey S Faherty

(57) ABSTRACT

Embodiments relate to improving user experiences when executing binary code that has been translated from other binary code. Binary code (instructions) for a source instruction set architecture (ISA) cannot natively execute on a processor that implements a target ISA. The instructions in the source ISA are binary-translated to instructions in the target ISA and are executed on the processor. The overhead of performing binary translation and/or the overhead of executing binary-translated code are compensated for by increasing the speed at which the translated code is executed, relative to non-translated code. Translated code may be executed on hardware that has one or more power-performance parameters of the processor set to increase the performance of the processor with respect to the translated code. The increase in power-performance for translated code may be proportional to the degree of translation overhead.

20 Claims, 10 Drawing Sheets

PERFORMANCE SCALING FOR BINARY TRANSLATION

CROSS-REFERENCE TO RELATED APPLICATION

This application is a continuation of, and claims priority to, U.S. patent application Ser. No. 16/714,626, issued as U.S. Pat. No. 11,157,279, filed on Dec. 13, 2019, and entitled "PERFORMANCE SCALING FOR BINARY TRANSLATION", which is a continuation of U.S. patent application Ser. No. 16/273,080, now U.S. Pat. No. 10,732,975, filed Feb. 11, 2019, and entitled "PERFORMANCE SCALING FOR BINARY TRANSLATION", which is a continuation of U.S. patent application Ser. No. 15/613,110, now U.S. Pat. No. 10,235,178, filed Jun. 2, 2017, and entitled "PERFORMANCE SCALING FOR BINARY TRANSLATION", the specifications of all of which are hereby incorporated by reference in their entirety for all that they teach and suggest.

BACKGROUND

Every processor implements a native instruction set architecture (ISA). An ISA is defined by features such as the semantics of operations, operation codes, instruction formats, endian-ness, memory architecture, and others. These features of ISAs vary from processor to processor. For instance, some ISAs may include operations that others do not. Some ISAs may have different word sizes. Some may lack certain registers that others have. There are many types of ISAs and their differences are well known.

There are problems that stem from the way that ISAs vary among processors. Most notably, compiled executable code is ISA-specific. That is, any given software is compiled only for a specific ISA. Any given compiled executable binary code will be unable to directly execute on chips whose ISA implementations are not compatible with the ISA for which the given code was compiled.

This mobility restriction on compiled code has long been known and several approaches have been used to enable cross-ISA execution. One approach has been the use of fat executable files. A fat executable file contains the binary code for two or more different ISAs. A fat executable contains two independent sets of executable code. When execution of a fat executable is requested, the loader loads the set of executable code that matches the ISA implementation of the machine on which it will execute. This approach requires additional storage. Moreover, a fat executable will still have considerably limited portability.

Another approach has been to use binary translation. Binary translation involves reading binary machine code compiled for one ISA ("source" ISA) and applying what are usually complex translation rules to the binary code to generate executable binary code for another ISA ("target" ISA). The translated binary code is executed on a processor that implements the target ISA. Binary translation can be performed in many ways. Translation can take place at runtime; source ISA code is translated (by translation instructions of the target ISA) to target ISA code when loaded. Such all-at-once translation can also be performed in advance and stored for use when needed, or it can be performed at load time (and perhaps cached for later re-use). In either case, the translated target ISA code is executed after translation is complete. In other cases, an emulator provides a virtual implementation of the source ISA (e.g., a virtual processor) and as the emulator receives source ISA code the emulator issues target ISA instructions that correspond to the source ISA instructions.

Depending on the particular instructions that predominate in source ISA code that is to be translated, most corresponding translated target ISA binary code will be less efficient than the equivalent source ISA code. In other words, given a source processor that implements a source ISA, and given a target processor of comparable performance that implements a target ISA, translated target ISA code will tend to take longer to execute on the second processor than the semantically equivalent source ISA code executing on the first processor. Although this is not always true, there is usually at least some variety of source ISA code that will execute significantly faster than its translated equivalent target ISA code.

There can be many reasons for translation performance degradation. Setting aside the processing needed to actually perform translation, translated code is translated from compiled binary executable code. Consider that a given unit of source code might be compiled for a first ISA and compiled for a second ISA, and the respective executables might be equally fast on their respective processors. However, a translation of the first executable to the second ISA may be much less efficient. Among other reasons, binary executable code lacks much of the information found in corresponding source code that can be used to optimize the code. Furthermore, code optimized for a source ISA may have been constructed in ways that work well with the source ISA but are ill-suited for the target ISA. Architectural differences may also result in some code for particular types of workloads being inefficient when translated. For instance, a source ISA might have an arithmetic logic unit (ALU) that implements a complex arithmetic operation in hardware. If a target ISA lacks that operation, translation to the target ISA will require inserting instructions to do the work of the single instruction of the source ISA. In general, any given compiled code will be likely to execute slower when binary-translated to another ISA.

Although translated binary code is known to be generally less efficient, only the inventors have appreciated that this can translate into user experience problems that can be solved. Most machines that execute translated code also executed non-translated code. If interactive applications of translated code and interactive applications of non-translated code are executed by a same user in a same session, the comparative speed differences of the translated and non-translated may be noticeable in respective graphical user interfaces (GUIs). Although a translated GUI might have acceptable responsiveness and be objectively useable, when experienced relative to a non-translated GUI, the slower speed of the translated GUI may stand out. Translated interactive applications may be perceived as slow when experienced in contrast to non-translated interactive applications. Described herein are techniques that can potentially smooth out the differences in speed and responsiveness of interactive translated code.

Techniques related to differential power/performance treatment for translated code are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to improving user experiences when executing binary code that has been translated from other binary code. Binary code (instructions) for a source instruction set architecture (ISA) cannot natively execute on a processor that implements a target ISA. The instructions in the source ISA are binary-translated to instructions in the target ISA and are executed on the processor. The overhead of performing binary translation and/or the overhead of executing binary-translated code are compensated for by increasing the speed at which the translated code is executed, relative to non-translated code. Translated code may be executed on hardware that has one or more power-performance parameters of the processor set to increase the performance of the processor with respect to the translated code. The increase in power-performance for translated code may be proportional to the degree of translation overhead.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
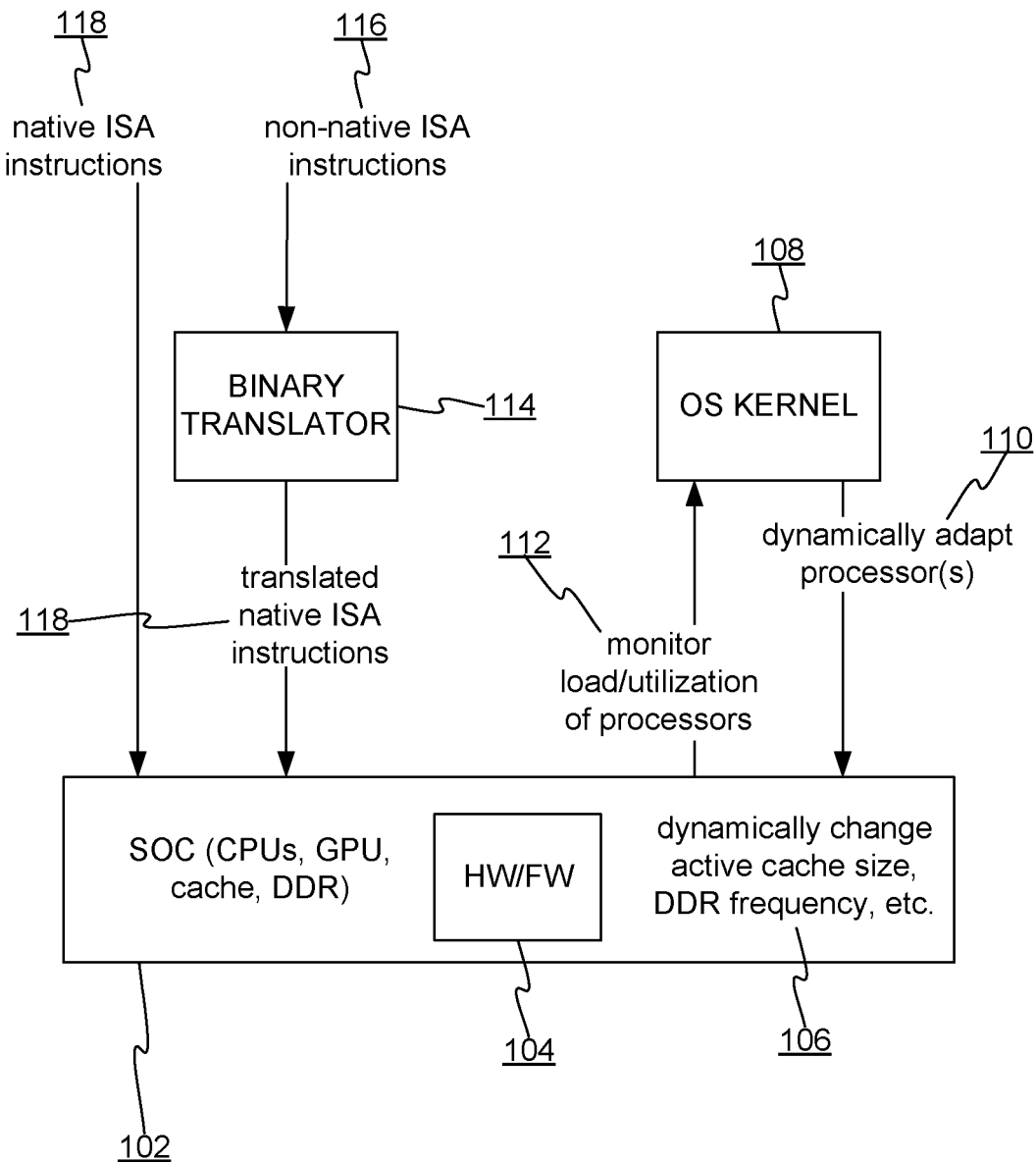
FIG. 1 shows a binary translator providing translated code to processing hardware.

FIG. 1 shows a binary translator 100 providing translated code to processing hardware 102. The processing hardware 102 may be any form of hardware that implements an instruction set architecture (ISA), which will be referred to as the target ISA. The processing hardware may be a system on a chip (SOC), a general purpose central processing unit (CPU), a graphics processing unit (GPU), a dynamically reprogrammable circuit such as a field programmable gate array (FPGA), or any other form of gate-based processing hardware, as described below with reference to FIG. 10. The processing hardware 102 may include general memory, caches (e.g., L1-L3 caches), and other elements that work in close cooperation with a processor. The processing hardware 102 may also be a combination of circuitry and/or firmware 104. The processing hardware may have multiple physical or logical cores. The term "core" will be used herein to refer to physical/logical cores and processors with single cores.

The processing hardware 104 also includes power-performance state 106. The power-performance state 106 refers to any dynamically changeable state of the processing hardware 104 that alters the power-speed balance of the processing hardware 104 ("speed" refers to the rate of executing arbitrary instructions). Processing hardware is known to be able to execute arbitrary instructions (machine code) at varying speeds. Generally, the speed of processing is a function of power consumed; the faster the processing hardware executes, the more power it consumes. The power-performance state 106 of a processor can be altered to increase or decrease its speed of execution. Speed of execution does not refer only to direct power-speed parameters such as clock speed. The power-performance state 106 can be a function of many elements of the processing hardware, for instance settings/parameters, registers, numbers or types of cores (e.g., "big" and "little"), clock rates of any processing hardware or memory, cache size(s), energization state (on/off, quiescent, etc.) of hardware elements, voltage levels supplied to various elements, etc. The power-performance state 106 may be thought of as indifferent to the particular code being executed, and rather is the effective available processing speed. Details of the power-performance state 106 are described in detail below.

The processing hardware 102 is part of a computing device which also includes an operating system kernel 108. The kernel 108 includes known functionality such as scheduling execution units (threads or processes), allocating memory, handling interrupts, and so forth. The kernel 108 may be configured to dynamically adapt 110 the power-performance state 106 to change the effective speed of the processing hardware. Although this technique has been known, it has mostly been used for changing the overall power-performance profile of the processor. The applicability of dynamic adjustment of power-performance state to binary code translation has only been appreciated by the inventors. The kernel 108 may also receive load/utilization data 112 from the processing hardware, which can be used in ways described further below.

As discussed in the Background, when the processing hardware implements an ISA that is incompatible with the ISA of code that is to be executed, the code to be executed may be translated from its source (non-native) ISA to the target (native) ISA of the processing hardware. Binary translation is well understood and details for performing binary translation between ISAs may be found elsewhere. Generally, however, a binary translator 114 receives non-native instructions 116, translates them, and outputs translated native ISA instructions 118. In contrast, native ISA instructions 120 are executed by the processing hardware without translation. As discussed in the Background, translation can be performed in advance (perhaps on a different computing device), or it can be performed on the fly at runtime. The time and place of translation is not significant to the embodiments described herein, so long as the kernel 108 is able to distinguish between translated and non-translated code. Ways of distinguishing translated code are discussed below with reference to FIG. 3.

Figure 2:
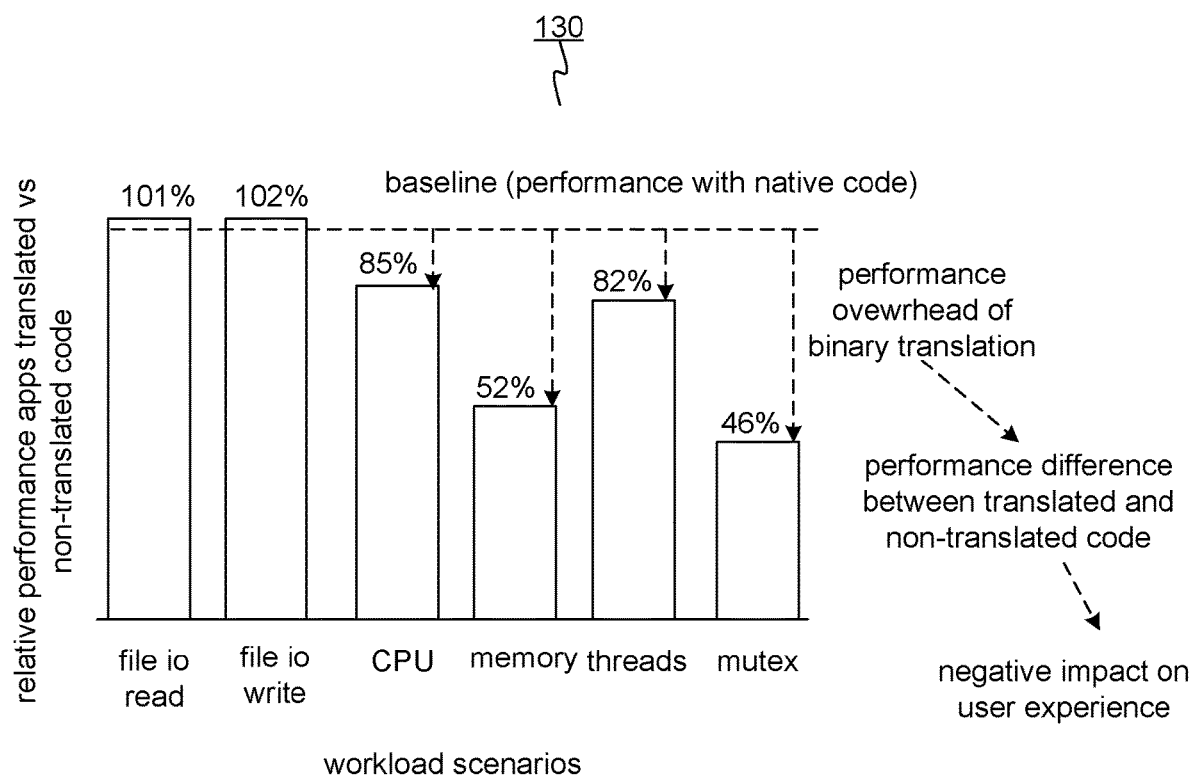
FIG. 2 shows a graph of examples of performance differences between translated and non-translated code.

FIG. 2 shows a graph 130 of examples of performance differences between translated and non-translated code. The examples in FIG. 2 are illustrative. Actual relative performances will depend on the particular hardware and code involved. With that in mind, the graph 130 shows different workloads and how their performance can be less efficient when the workload consists of translated code versus non-translated code. For some workloads such as file I/O, performance may be comparable. As shown in FIG. 2, for other workloads the performance may be lower. The performance degradation due to binary translation may include a component for performing binary translation, if translation is performed at runtime. If translation is included, the total performance loss for translation is a combination of the processing required for performing translation and the lesser efficiency of code that has been translated.

Figure 3:
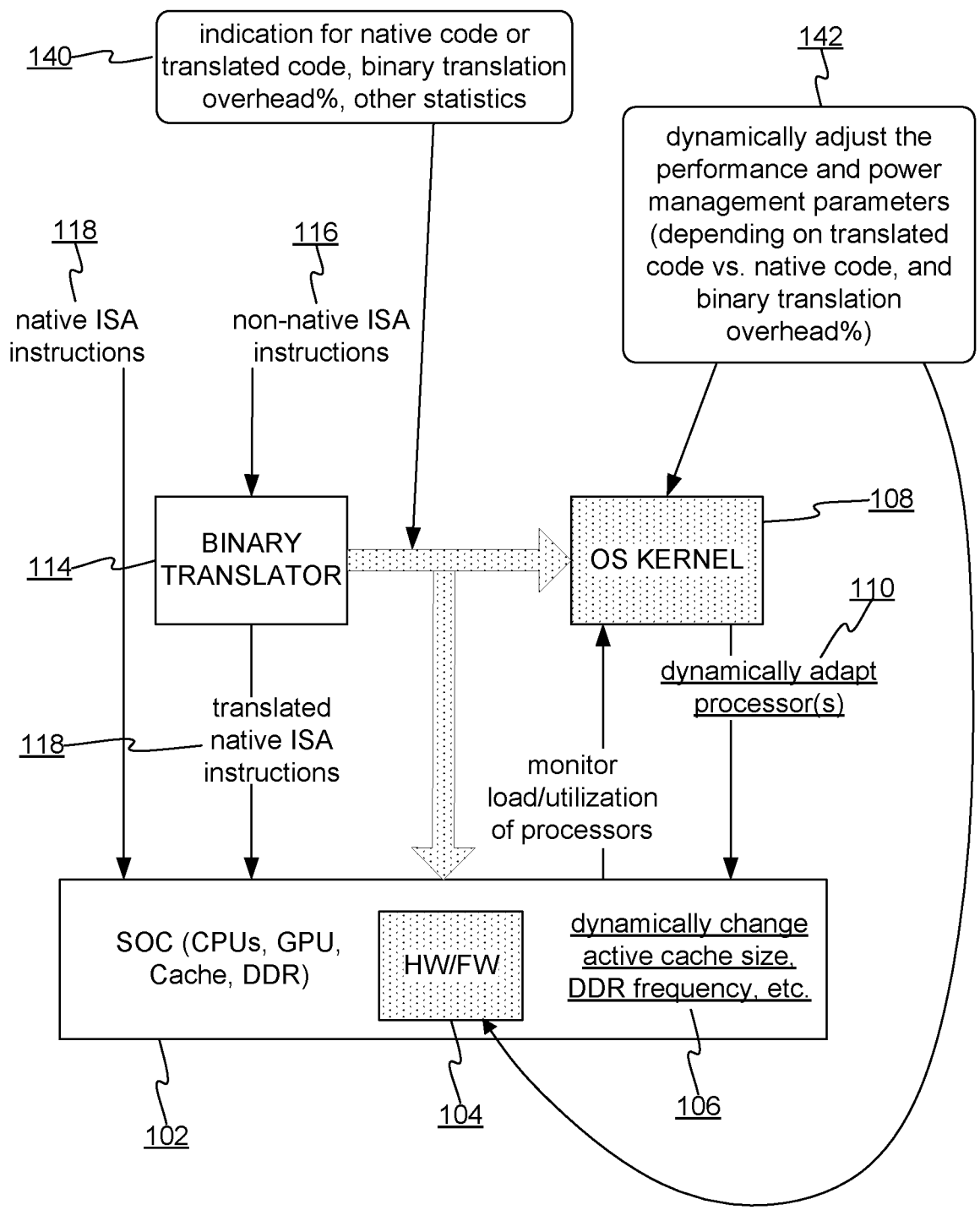
FIG. 3 shows a system configured to adapt power-performance state based on whether code has been translated or not.

FIG. 3 shows a system configured to adapt the power-performance state 106 based on whether code has been translated or not. When code is translated, information reflecting that fact is stored with the associated code. In one embodiment, an indication 140, flag, property, etc., is set in association with the translated code. This can be implemented in a number of ways. When non-native code is initially read by an operating system loader, the loader can set a property of a new process (or thread) to indicate that the code will be translated when it is executed. Another approach is to maintain a new data structure such as a table indexed by process or thread number, where inclusion in the table represents signifies translation. In other embodiments, the translated nature of code may be represented by how the code is managed. For example, a particular core, memory space, or the like, may be dedicated to translated code and presence therein may indicate that code has been translated.

If translation has been performed in advance, for instance loaded from a fat binary file, then the code's status of having been translated by be detected from a property of the executable file or a header field therein. In another embodiment, it may be possible to infer, during the execution of translated code, that the has been translated. The state of having been translated may be inferred by examining instruction patterns, identifying telltale signs in the code, heavy use of particular registers, or performance profile statistics that accumulate during execution of the code. In one embodiment, it is the kernel 108 that tracks which execution units of code have been translated and which have not.

In some embodiments, the binary translator 114, or the operating system's loader, in the case of pre-translated code, may also provide translation information to the kernel 108. The translation information is any information about the translation of the corresponding code that can be used to fine-tune adjustments to the power-performance state 106. The translation information may include a direct estimate of the reduced efficiency (or overhead) of the translated code. If translation is performed at runtime, the translation information might include information about how much processor work was expended by the binary translator 114 to translate the code. In one embodiment, code may be profiled (before, during, or after translation) and a workload category might be provided as the translation information. Any information about the characteristics of the non-native (source ISA) code and/or the corresponding translated native ISA code may be passed to the kernel 108 to help inform the kernel's adaption of the power-performance state 106, which is discussed next.

The kernel 108 is configured to use the indicia of translated code and/or the translation information to dynamically adjust 142 the power-performance state 106 to cause translated code to execute faster than it otherwise might. An existing operating system kernel may be modified to implement the translation-sensitive kernel 108. As most kernels manage execution units, schedule processor time, and have privilege to alter processor state, an existing kernel may be readily adapted as described herein. The kernel 108 may recognize translated code in any of the ways described above. Details of how the kernel 108 boosts translated code and how much such code is boosted are described next.

Figure 4:
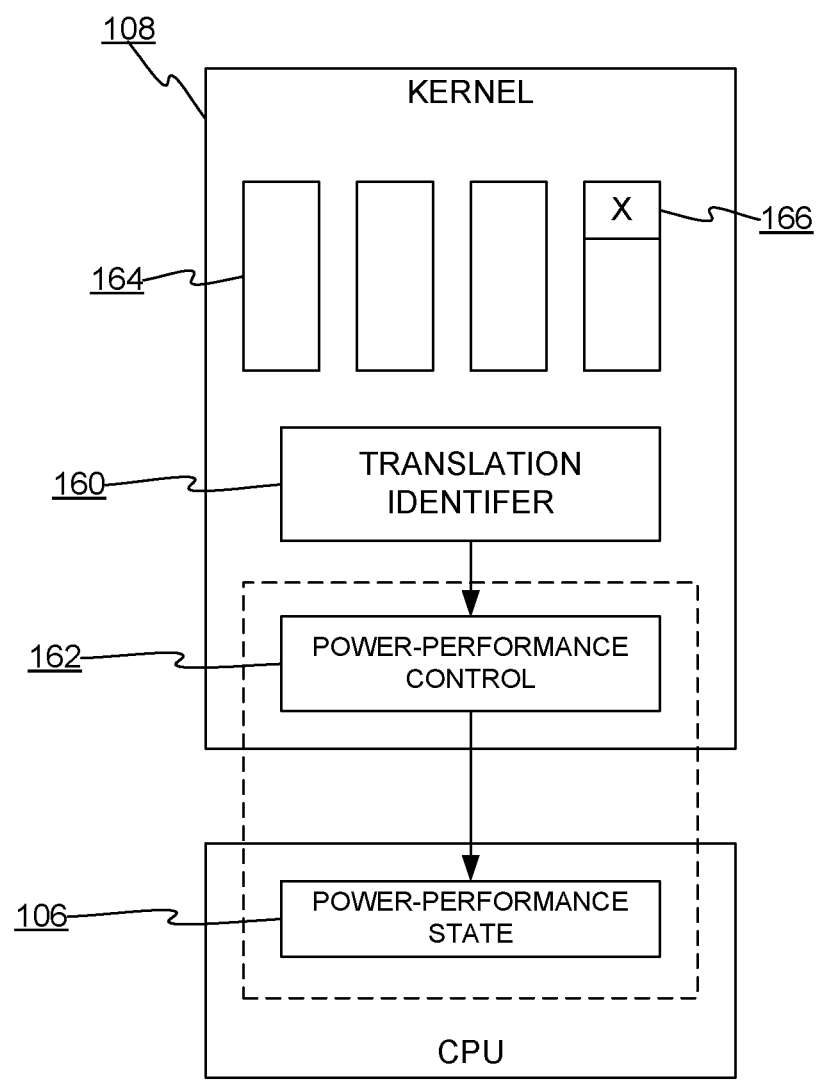
FIG. 4 shows a kernel with a translation identifier and a power-performance control unit.

With respect to how to boost translated code, FIG. 4 shows the kernel 108 with a translation identifier 160 and a power-performance control unit 162. The translation identifier 160 identifies code, for instance threads 164, that have been translated from a non-native ISA. As noted above, individual threads that have been translated may be marked with a translation flag 166. Translation status may also be inferred from properties of the executing code, from runtime statistics, an associated workload typing-flag (e.g., "interactive", "network", "I/O", etc.) stored in a thread or process table, or used only transiently when code is initially loaded for execution (when executable memory space is allocated) by assigning the code to a core or core pool that is specifically for translated code and operates with higher performance and power consumption. The translation identifier 160 assures that translated code is either properly assigned according to its translation. A thread's translation flag 166 may also be read each time the thread is scheduled for execution and at that time and on that basis the executing core is sped up.

The power-performance control unit 162 is a kernel module that communicates with the processing hardware to configure the power-performance state 106 as needed. In one embodiment, if the kernel already has a power management system, the power management system may be leveraged for adjusting processor speed, since less parsimonious power policies usually provide faster processing. As mentioned above, any of the power-performance parameters described above may be adjusted to increase the speed of executing translated code. In one embodiment, clock frequency of a processor and/or memory is elevated relative to non-translated code. In another embodiment, voltage is increased. Another approach is to increase the voltage of a core executing translated code. The size of a processor's cache may also be increased. If the processing hardware is able to change processor state quickly, e.g., change its clock frequency (or P-state) without causing significant delay, then processors or cores may be dynamically sped up each time translated code is scheduled for execution, and dynamically slowed back down each time non-translated code is scheduled for execution.

It is also possible to have differential translated/non-translated execution speed by suing designated slow cores and fast cores, and assigning translated code to execute on the fast cores and non-translated code to execute on the slow cores. Cores can be faster by virtue of their design (e.g., "BIG" cores with more speed and power consumption), by adjusting power-performance settings for faster speed, etc. Cores can also be managed as pools, where a fast pool is maintained to have lower collective load than a slow pool. Threads may be moved among pools to assure that a lower-load pool is maintained and available for translated code. If the load on the fast pool becomes too high, threads may be shifted out to the slow pool. Yet another approach is to vary the number of cores that are energized and in service at one time.

The amount of the boost, or adjustment of power-performance state 106, is now discussed. Regardless of which power-performance parameters are adjusted to boost translated code, the values of such parameters must be chosen. Whether it be a frequency, a voltage, a cache size or core number, one or more values are needed. Because the precise values will depend on many factors, general methods are described. The degree of adjustment can be static or determined dynamically. Moreover, the degree of adjustment may be a scalar value or a ratio, depending on the power-performance parameter being changed.

Static adjustment may be as simple as using fixed parameters or a single scaling factor. Static adjustment may be preferred when the only translation information available is the fact that code has been translated or when the processing hardware cannot spare extra cycles for the overhead of deriving finely-tuned parameter values. The static approach involves the kernel 108 boosting each translated execution unit by a globally fixed overhead factor. The amount of boost may take into account whether translation is being performed on-the-fly (in ongoing fashion by an active translator) or translation was performed in advance. Code translated on-the-fly may include additional boost to compensate for the computation cost of translation.

Another scheme is to adapt power-performance state parameters of the processing hardware 102 by different amounts for different execution units of translated code, or even for different instructions. This approach may use any translation information provided by the translator about the execution units of translated code. For example, if the workload type of a thread is known, that can be used to select an appropriate adjustment. A thread that is for I/O might receive little or no boost, whereas a thread marked as being graphics intensive might receive additional boost. This dynamic approach to processing speed adjustment may also be performed with greater precision, if the overhead is acceptable. The boost for an individual execution unit may be increased and decreased during its execution based on runtime statistics such as which instructions are executed the most, performance of the unit, memory access patterns, profile statistics obtained from the translation process, etc. If a workload-type flag is maintained for a thread, the workload-type flag might be changed during execution to reflect the changing nature of the thread, which in turn drives power-performance adaptation for the thread. Similarly, if translation is being performed on-the-fly, the changing cost of translation can be used to repeatedly change the power-performance state. In one embodiment, the binary translation process, during translation, estimates the efficiency (performance loss) of translated code. If translation happens on-the-fly, the translator can continually inform the kernel about the estimated efficiency of the translated code that is being supplied for execution.

Figure 5:
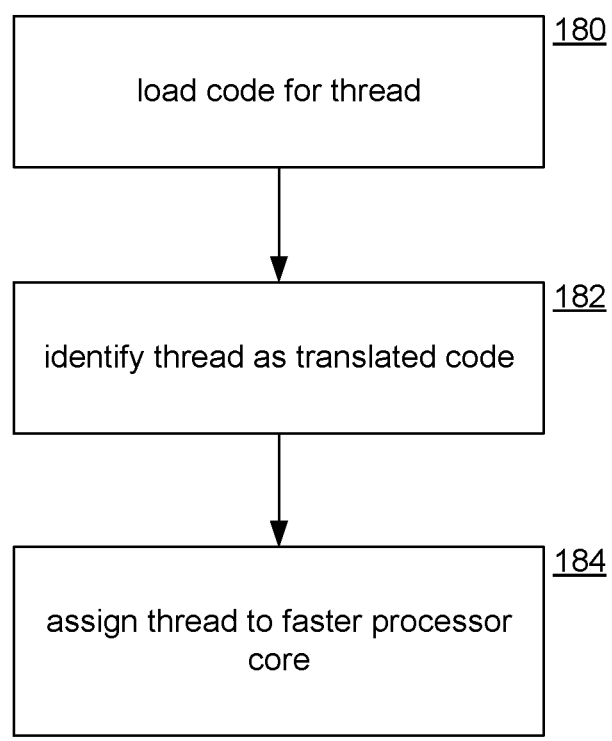
FIG. 5 shows a process for using core assignment to boost the relative speed of translated code.
Figure 6:
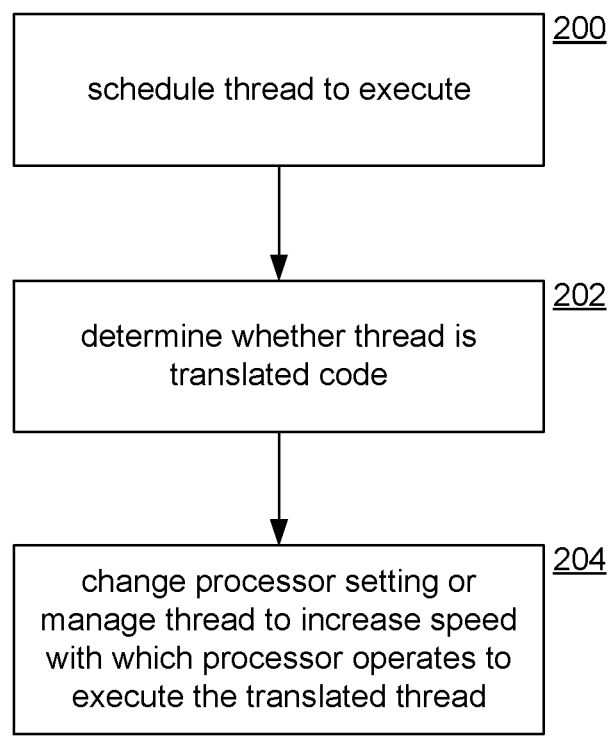
FIG. 6 shows a process for adjusting the power-performance state when translated code is scheduled for execution by the kernel.

FIG. 5 shows a process for using core assignment to boost the relative speed of translated code. At step 180 code is loaded for execution. At step 182 the thread is identified as being translated from non-native code. The thread is optionally marked as being translated code. At step 184 the thread is assigned to a fast core designated for translated code. FIG. 6 shows a process for adjusting the power-performance state when translated code is scheduled for execution by the kernel. At step 200, a thread is scheduled to execute per the multi-tasking logic of the kernel. At step 202, the kernel determines whether the scheduled thread is translated code. Based thereon, at step 204 the kernel changes the processor's or core's power-performance state to increase the speed of the translated code.

Figure 7:
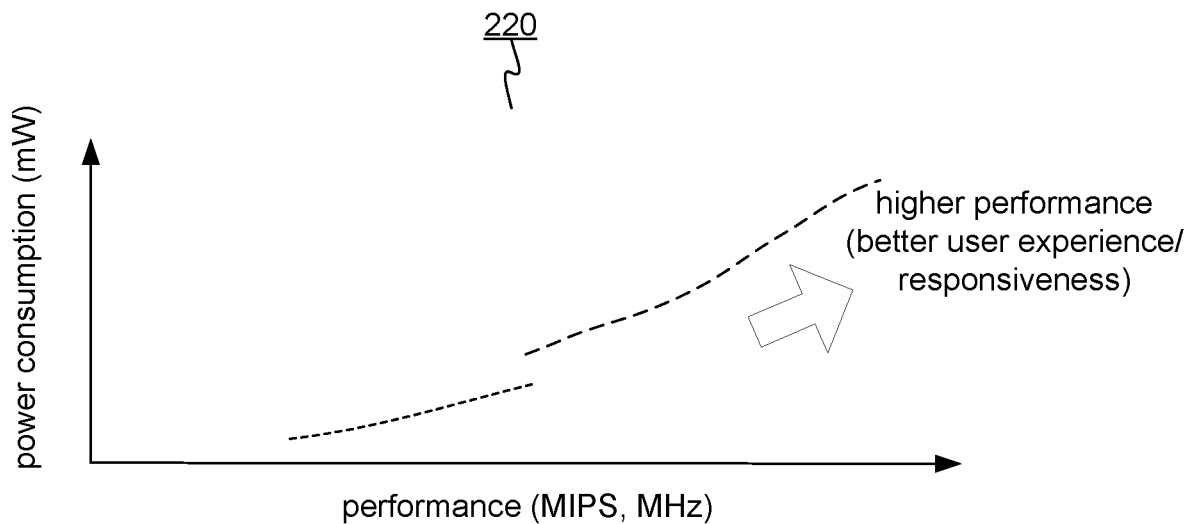
FIG. 7 shows how power-performance can vary among big and little cores of an arbitrary processor.
Figure 7:
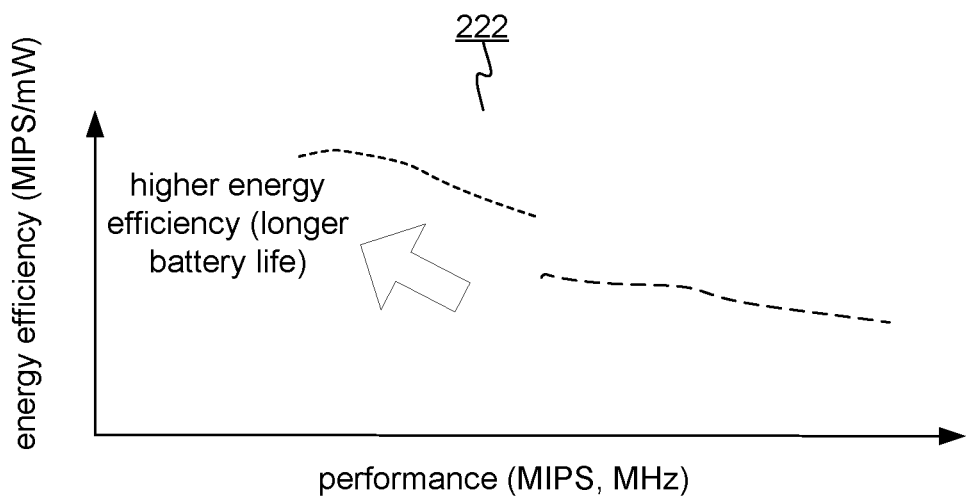

FIG. 7 shows how power-performance can vary among big and little cores of an arbitrary processor. Chart 220 shows that big cores have higher maximum performance but also have a higher power consumption. Chart 220 shows that little cores are more energy efficient. These charts also illustrate the relationship between power and performance. As a processor's energy supply increases, the processor's performance increases. The embodiments described above take advantage of these properties by controlling which curve (big or little) is used for translated code and/or controlling the point on a performance curve where code falls based on whether it was translated. However, given decline in energy efficiency as performance increases, for battery operated processing hardware it is preferable to minimize the amount of boost provided to translated code.

Figure 8:
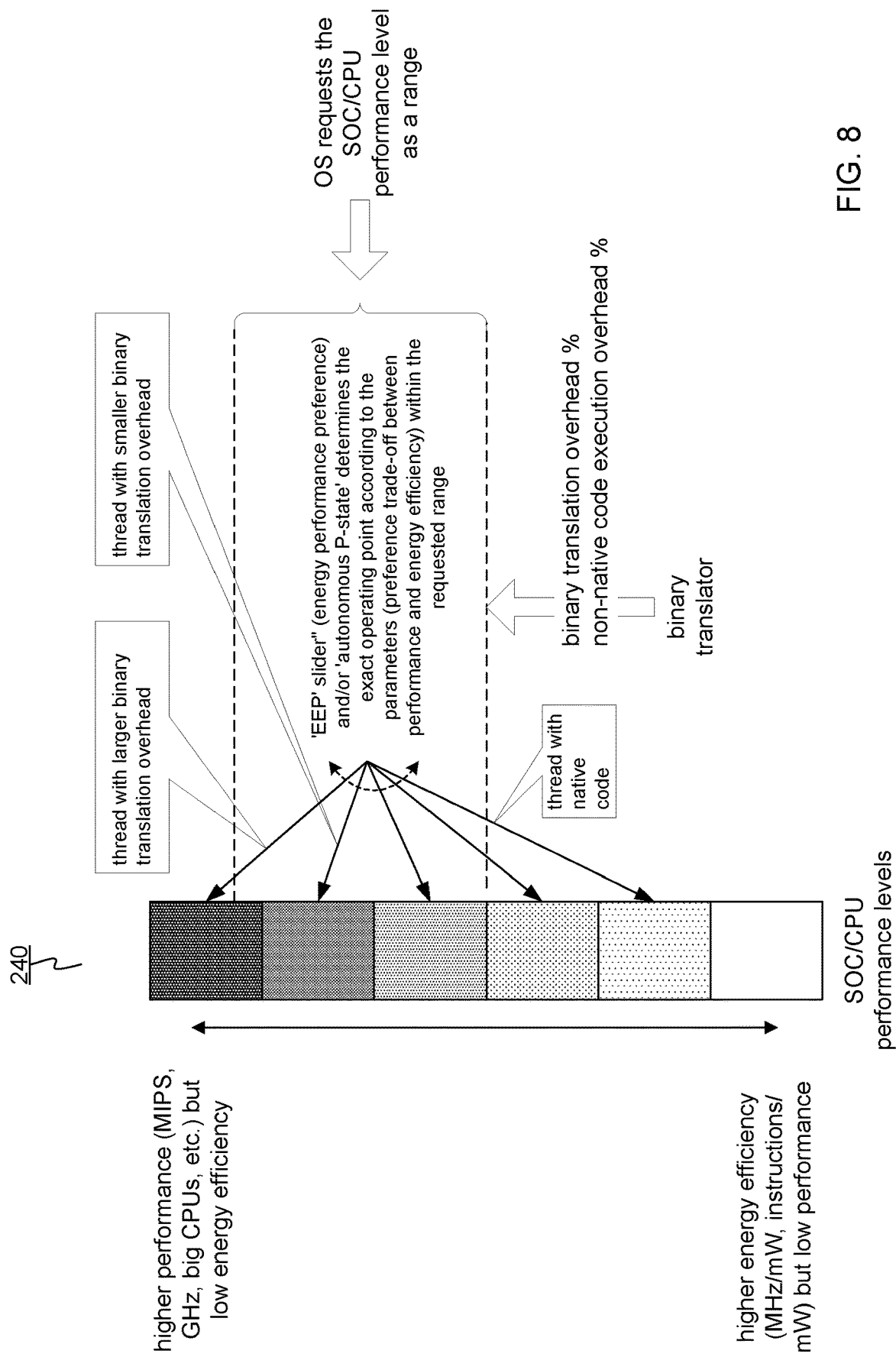
FIG. 8 shows a diagram illustrating the concept of scaling performance based on binary translation.

FIG. 8 shows a diagram 240 illustrating the concept of scaling performance based on binary translation. Various performance levels are available as described. For example, the binary translator provides information about expected overhead of translation and/or the overhead of executing translated code. The kernel has a sliding scale of power-performance levels for translated and non-translated code. Execution units, e.g. threads, that are native non-translated code are assigned to hardware (or have their relevant hardware adjusted) to provide a lower performance level. Threads with code translated from non-native code are provided/assigned hardware performance levels in accordance with their estimated translation overhead. Threads with the highest overhead are executed at the highest performance level.

For convenience of programming, the kernel may implement an abstraction layer that maps abstract performance levels to possibly complex adjustments to the power-performance state of the processing hardware. If an existing kernel is being modified and the kernel has a power management scheme that allows different levels of power conservation to be selected, then it may be convenient to adapt the power management scheme, since power is correlated with performance (additional changes may be needed to enable power leveling on a per-thread or per-process basis).

Figure 9:
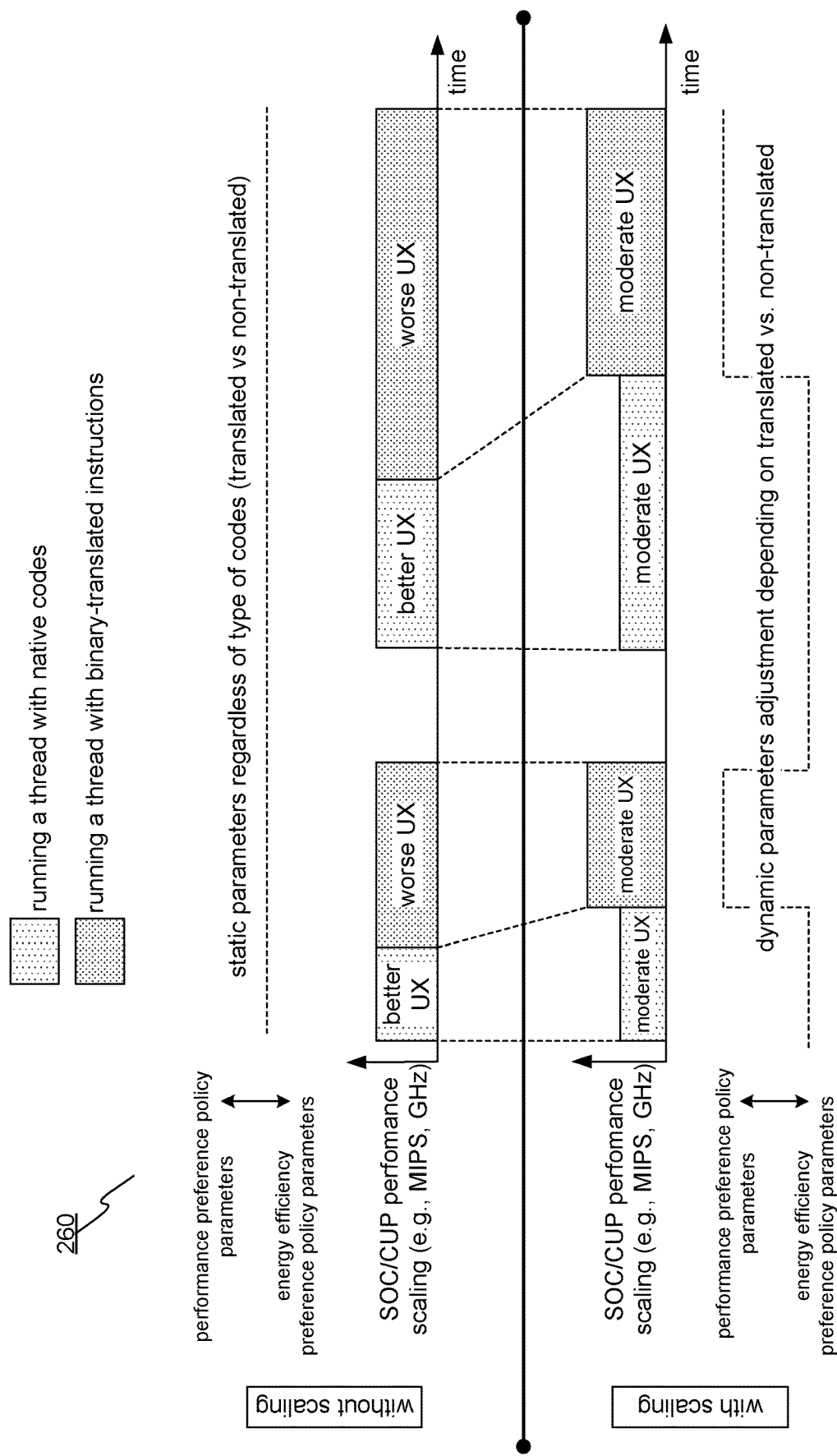
FIG. 9 shows a diagram illustrating how embodiments can result in improved user experiences.

FIG. 9 shows a diagram 260 illustrating how embodiments described above can result in improved user experiences. In the upper half of FIG. 9, power-performance scaling is not performed for translated code. The lower half of FIG. 9 shows the same code executed with power-performance scaling. Note that binary-translated instructions take longer to run when scaling is not used (upper half of FIG. 9). It is possible to reduce the differential between native and non-native code by lowering the overall power-performance level for when native code is executing. Thus, the lower half of FIG. 9 shows longer execution times for native non-translated code.

The user experience differences can be loosely quantified. As noted, the effective user experience (effective execution speed) of threads of native code and threads of non-native code becomes similar by slowing down the hardware performance for threads of native codes and speeding up the hardware performance for threads of non-native codes. It is possible to determine slow-down and speed-up ratios that will equalize effective user experience (effective execution speed) of native code versus non-native code. The followings are examples of formula. Let "H" represent binary translation overhead (e.g. 0: no overhead, 1: x2 execution time). A hardware performance (e.g., MHz) scale-down ratio for threads of native codes is $2/(2+H)$. A hardware performance (e.g., MHz) scale-up ratio for threads of non-native codes is $(2(1+H))/(2+H)$.

The dynamic power-performance adjustment times need not align precisely with times when translated code begins executing. A heuristic might predict that translated code is expected to start executing and trigger an increase in performance. The elevated performance level might be maintained for a short time after the translated code has finished executing to account for brief interrupts or context switches where the translated code is only briefly swapped out and is then swapped back in. There may also be workload or scenarios where translated applications tend to be used in succession. For a suite of non-native applications might be installed on the relevant computing device, and launching one of those applications might serve as a clue to enter a "pro-boosting" mode where performance boosting is extended or more easily triggered.

Embodiments may be implemented in other ways besides kernels. For example, a system-on-a-chip (SOC) might implement the embodiments in hardware. Furthermore, the embodiments can be implemented in the kernel of a virtualization hypervisor or in a privileged partition or virtual machine that controls virtual processor scheduling.

Figure 10:
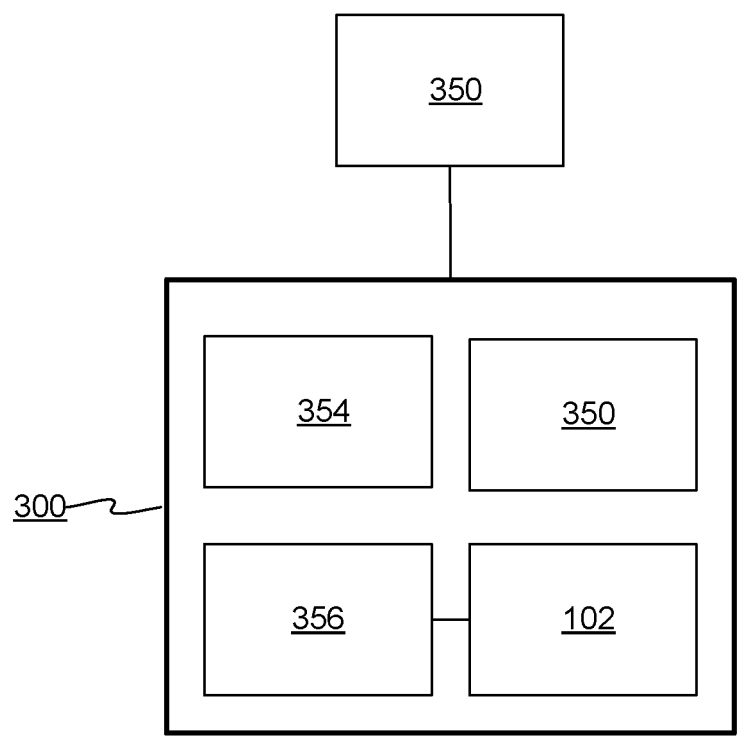
FIG. 10 shows details of a computing device on which embodiments described may be implemented.

FIG. 10 shows details of a computing device 300 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 to implement any of the features or embodiments described herein.

In addition to a display 350, the computing device 300 may have a network interface 354 (or several), as well as storage hardware 356 and processing hardware 102, which, as discussed above, may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 356 may be any combination of magnetic storage, static memory, volatile memory, non-volatile memory, optically or magnetically readable matter, etc. The meaning of the terms "storage" and "storage hardware", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 102. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computing device comprising:
processing hardware that can vary a speed at which instructions provided to it are executed by a processor, the processing hardware comprising the processor, the processor configured to execute instructions according to a target instruction set architecture (ISA), the processing hardware configured to vary the speed at which a first provided execution unit is executed according to an indication of whether the first provided execution unit comprises translated instructions, a translated instruction being an instruction translated from one or more source instructions in a source ISA, where the one or more source instructions cannot natively execute on the processor.

2. The computing device of claim 1, wherein the one or more source instructions cannot natively execute on the processor because the source ISA comprises instructions not present in the target ISA.

3. The computing device of claim 1, wherein the varying the speed at which the first provided execution unit is executed comprises increasing the speed at which the instructions are executed by the processor based at least in part on the indication that the first provided execution unit comprises translated instructions.

4. The computing device of claim 1, wherein the varying the speed at which the first provided execution unit is executed comprises increasing and decreasing an execution speed boost for the first provided execution unit during its execution based on runtime statistics.

5. The computing device of claim 4, wherein the runtime statistics comprise a statistic selected from the group consisting of:
which instructions are executed most;
a performance of the processor in executing the first provided execution unit;
a memory access pattern; and
a profile statistic obtained from a translation process.

6. The computing device of claim 1, wherein the indication of whether the first provided execution unit comprises translated instructions is inferred from properties of the first provided execution unit.

7. The computing device of claim 1, wherein the indication of whether the first provided execution unit comprises translated instructions is provided to the processing hardware.

8. The computing device of claim 7, wherein the indication of whether the first provided execution unit comprises translated instructions is a flag provided to the processing hardware with the first provided execution unit.

9. The computing device of claim 1, wherein the processor comprises a big core and a little core; and
wherein further the varying the speed at which the first provided execution unit is executed comprises executing the first provided execution unit on either the big core or the little core.

10. A computing device comprising:
a processor comprising a big core and a little core, the big core configured to implement a first instruction set architecture (ISA), the little core configured to implement a second ISA, wherein the big core and the little core have different performance per power consumption, wherein the computing device is configured to assign a first execution unit to be executed on the little core based at least in part on determining that the first execution unit comprises binary instructions translated from other binary instructions, wherein the binary instructions would need to be translated even if the first instruction unit was executed on the big core.

11. The computing device of claim 10, wherein the first ISA is the same as the second ISA.

12. The computing device of claim 10, wherein the assigning the first execution unit to be executed on the little core being further based at least in part on the little core being designated as a fast core.

13. The computing device of claim 10 wherein the determining that the first execution unit comprises binary instructions translated from other binary instructions is inferred from properties of the first provided execution unit.

14. The computing device of claim 10 wherein the determining that the first execution unit comprises binary instructions translated from other binary instructions is based on a flag associated with the first execution unit.

15. A method performed by a computing device, the method comprising:

executing an operating system that provides execution units to be executed by processing hardware that can vary a speed at which instructions provided to it are executed by a processor, the processing hardware comprising the processor, the processor configured to execute instructions according to a target instruction set architecture (ISA); and executing the execution units by causing the processor to vary the speed at which a first provided execution unit is executed according to an indication of whether the first provided execution unit comprises translated instructions, a translated instruction being an instruction translated from one or more source instructions in a source ISA, where the one or more source instructions cannot natively execute on the processor.

16. The method of claim 15, wherein the processor comprises a big core and a little core; and wherein further the varying the speed at which the first provided execution unit is executed comprises executing the first provided execution unit on either the big core or the little core.

17. The method of claim 16, wherein the varying the speed at which the first provided execution unit is executed comprises executing the first provided execution unit on the little core based at least in part on the little core being designated as a fast core.

18. The method of claim 15, wherein the varying the speed at which the first provided execution unit is executed comprises increasing the speed at which the instructions are executed by the processor based at least in part on the indication that the first provided execution unit comprises translated instructions.

19. The method of claim 15, wherein the executing the operating system comprises inferring, by the operating system, that the first provided execution unit comprises translated instructions based on properties of the first provided execution unit.

20. The method of claim 15, wherein the executing the operating system comprises setting, by the operating system, a flag associated with the first provided execution unit, the flag indicating that the first provided execution unit comprises translated instructions.

* * * * *